United States Patent [19]

Kim

[11] Patent Number: 5,213,258
[45] Date of Patent: May 25, 1993

[54] RESEALABLE, RETURNABLE ENVELOPE

[76] Inventor: Myun H. Kim, 147-30 38th Ave. Apt. LB, Flushing, N.Y. 11354

[21] Appl. No.: 928,615

[22] Filed: Aug. 10, 1992

Related U.S. Application Data

[63] Continuation of Ser. No. 695,205, May 3, 1991, abandoned.

[51] Int. Cl.⁵ ............................................. B65D 27/06
[52] U.S. Cl. .................................. 229/305; 229/301; 229/309
[58] Field of Search ............... 229/73, 80, 238, 239, 229/300, 301, 309, 311, 305

[56] References Cited

U.S. PATENT DOCUMENTS

| | | | |
|---|---|---|---|
| 192,522 | 6/1877 | Marshall | 229/301 |
| 3,653,585 | 4/1972 | Kazaros | 229/309 |
| 4,795,035 | 1/1989 | Kim | 229/311 X |
| 5,035,329 | 7/1991 | Kim | 229/309 X |

FOREIGN PATENT DOCUMENTS

| | | | |
|---|---|---|---|
| 78967 | 5/1983 | European Pat. Off. | 229/80 |
| 354430 | 7/1920 | Fed. Rep. of Germany | 229/73 |
| 228664 | 12/1943 | Switzerland | 229/73 |
| 118376 | 8/1918 | United Kingdom | 229/73 |
| 2101528 | 1/1983 | United Kingdom | 229/73 |
| 2179324 | 3/1987 | United Kingdom | 229/73 |

*Primary Examiner*—Gary E. Elkins
*Assistant Examiner*—Jes F. Pascua
*Attorney, Agent, or Firm*—Schweitzer Cornman & Gross

[57] ABSTRACT

A reusable, returnable envelope is disclosed, which has a removable front cover sheet and a resealable closure flap. A primary envelope body has a front wall, a back wall, and a sealable closure flap. A tear-away front cover sheet is secured over the face of the front wall and carries a first address. After removal of the cover sheet, the front wall is exposed, which forms an address area and can be provided with a pre-printed return address. The closure flap includes at least two adhesive areas separated by at least one tear strip element and at least one guide strip associated therewith. On the first use of the envelope, the closure flap is opened without destruction by pulling on the tear strip, severing the original flap across its width and forming a new, shorter closure flap. The envelope is readied for its second use by removal of the front cover sheet and resealing of the closure flap using the second adhesive area. Preferably, a second tear strip/guide strip combination is provided to facilitate re-opening of the closure flap.

1 Claim, 3 Drawing Sheets

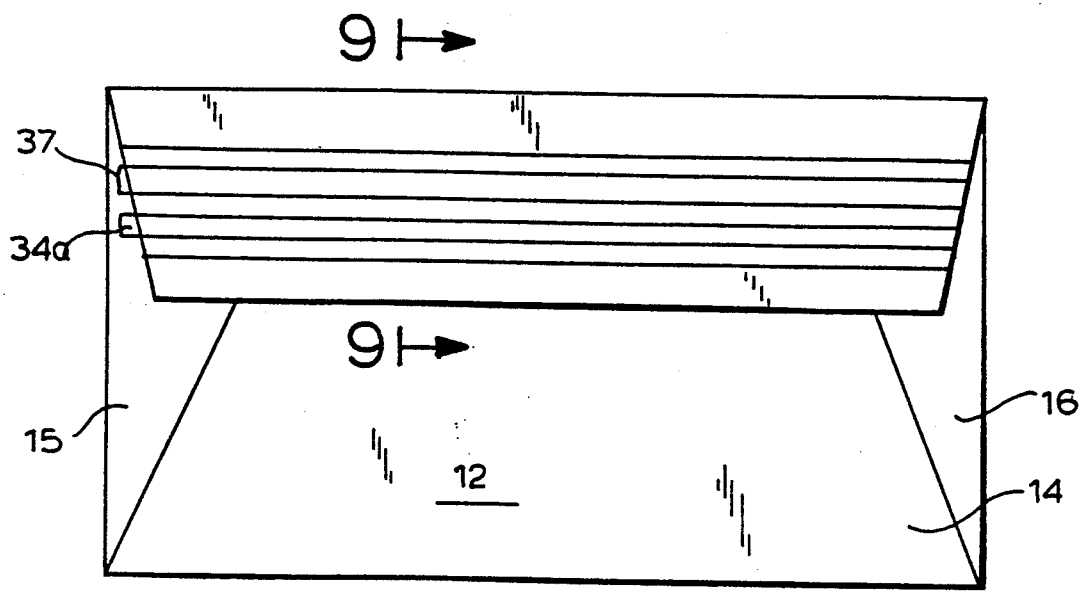
FIG. 8
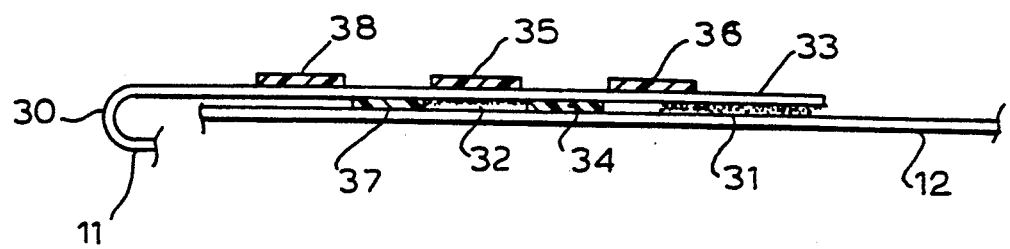
FIG. 9
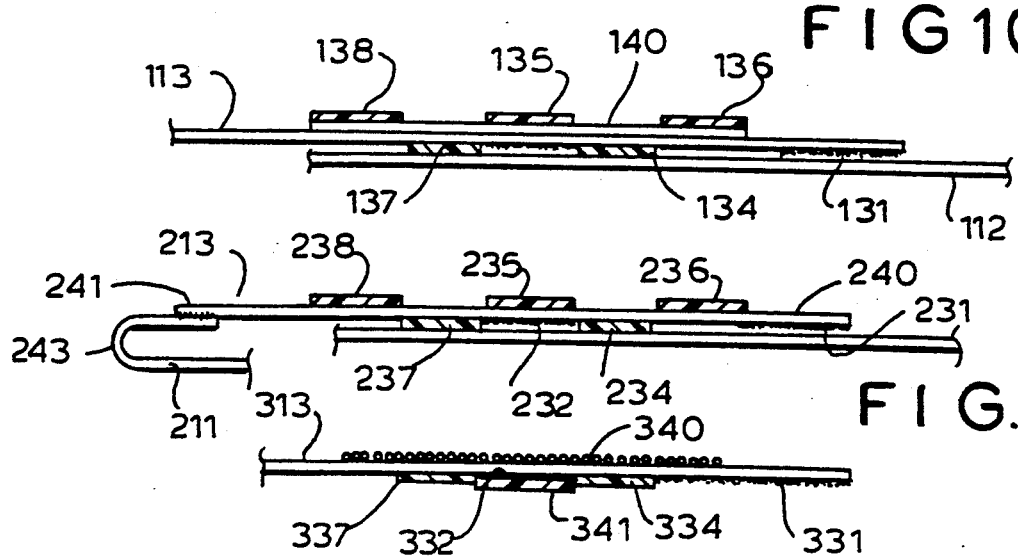
FIG. 10
FIG. 11
FIG. 12

RESEALABLE, RETURNABLE ENVELOPE

This is continuation of application Ser. No. 07/695,205, filed May 3, 1991, now abandoned.

BACKGROUND AND SUMMARY OF THE INVENTION

The present invention is directed to an improvement in reusable, returnable envelopes to facilitate the use of a single envelope structure for the forwarding of mail to a first addressee followed by the use of the same envelope for return mailing or forwarding onto a different destination.

Return envelope structures are, in general, well known. Frequently, they are utilized for mailing of invoices, for example. The structure typically is such that, when the envelope arrives at its initial destination and is opened and the contents removed, a structure remains which can be used as a return envelope. The return envelope structure may be preaddressed and provided with postage, for example. Conventional structures of this type frequently employ a return envelope structure which is smaller than the envelope in which the initial delivery was made. In most cases, the structure is quite complex and somewhat costly to produce and/or somewhat difficult to utilize because of a requirement for performing special tearing or folding operations in order to construct the return envelope.

In accordance with the present invention, a novel and improved return envelope is provided, in which a single, primary envelope structure serves to enclose the delivery materials for the return trip as well as for the initial delivery. As one result of this construction, the return envelope is necessarily of the same size as the envelope used for the initial delivery.

Pursuant to the invention, a primary envelope structure, which includes a front wall, a back wall, and a sealable closure flap, is provided with a tear-away front cover sheet, adhesively bonded to the front wall of the envelope, typically at the edge margins only, and which has defined tear-away characteristics. The tear-away cover sheet includes provision for postage and addressing for the first delivery. After the envelope has arrived at its first destination, the front cover sheet is torn away, exposing the principal front wall of the envelope, which can be preaddressed if desired.

Also in accordance with the invention, the sealable closure flap is provided with two distinct areas of sealing adhesive, one adjacent the free edge of the flap, and a second area spaced a short distance away from the first. At least one tear strip element is carried by the closure flap, in the region between the first and second areas of adhesive. Likewise, at least one guide strip element is provided parallel to and arranged for cooperation with the tear strip element. Upon delivery of the envelope at its first destination, the envelope is opened by removal of the tear strip element, severing the closure flap cleanly along a line defined by the tear strip and guide strip elements. After opening in this manner, the closure flap remains functional for a further use, by means of a second area of adhesive, which is now positioned at or near the cleanly torn free edge of the remaining flap section.

In a preferred embodiment, the closure flap includes at least two tear strips and at least two sets of guide strips, so that opening of the envelope after the second delivery is also facilitated.

The structure of the invention is extremely simple and economical to produce, yet is functionally superior to known constructions.

For a more complete understanding of the above and other features and advantages of the invention, reference should be made to the following detailed description of preferred embodiments of the invention, and to the accompanying drawings.

IN THE DRAWINGS

FIG. 8 is a back plan view of the envelope of FIG. 1, illustrating a preferred form of sealable closure flap.

FIG. 9 is an enlarged, fragmentary cross sectional view as taken generally on line 9—9 of FIG. 8.

FIGS. 9–14 are cross sectional views, similar to FIG. 9, illustrating modified forms of structures for sealing and opening the closure flap of the envelope.

DESCRIPTION OF PREFERRED EMBODIMENTS

Figure 1:
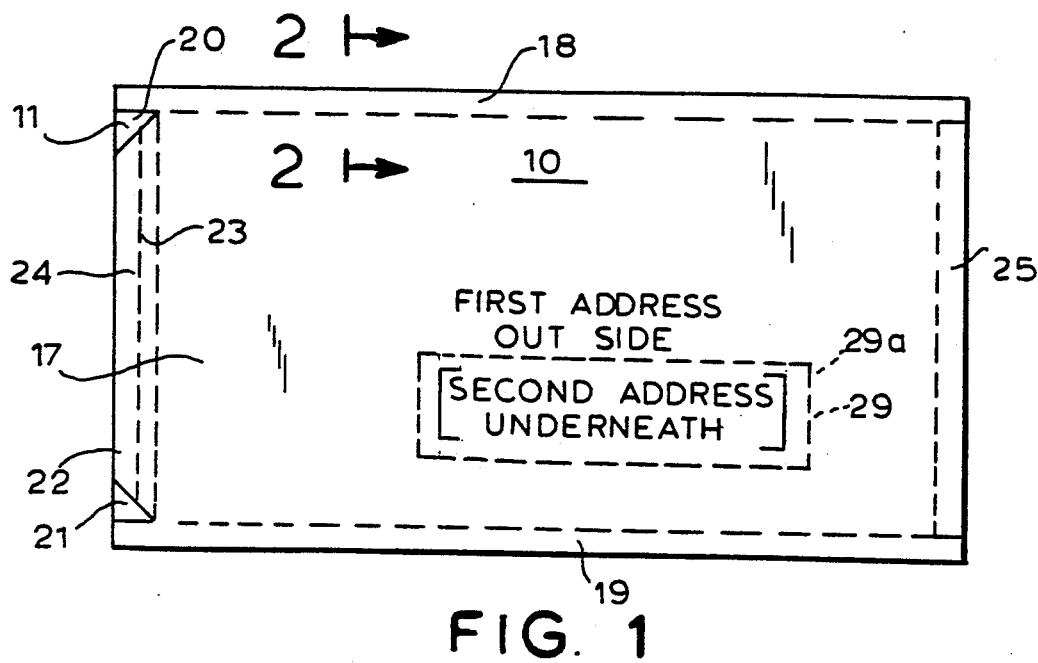
FIG. 1 is a front elevational view of a returnable envelope according to the invention.

Referring now to the drawing, the reference numeral 10 designates generally a reusable, returnable envelope according to the invention. The envelope includes a primary envelope structure comprised of a front wall 11, a back wall 12 (FIG. 7) and a sealable closure flap 13. The back wall 12 may conventionally consist of an upwardly folded bottom flap 14 and inwardly folded end flaps 15, 16 all pursuant to well-known concepts.

Pursuant to the invention, the primary envelope structure is provided with two major additions. First, there is a tear-away cover sheet 17, which preferably covers the entire exposed surface of the envelope front wall 11 and, at a minimum, covers those portions of the front wall 11 where the destination address, return address, if any, and postage would customarily be applied. In the illustrated arrangement, the cover sheet 17 extends over the surface of the front wall and is secured at its upper and lower edge margins 18, 19 by suitable adhesive means (of which a variety of examples will be described). At one end, preferably the left side, the cover sheet is notched, as indicated by the reference numerals 20, 21, to form a pull-tab 22. A portion 23 of the pull-tab is adhered to the face of the envelope wall 11 by a releasable adhesive (i.e., one that will release the cover sheet without tearing either the cover sheet or the underlying front wall of the envelope). The outer end portion 24 of the pull-tab, preferably, is left unattached, providing a narrow margin for gripping the tab and pulling it toward the opposite side edge of the envelope, in order to remove the tear-away cover sheet, when desired. At the opposite edge of the envelope, a side margin 25 of the cover sheet is adhered to the front wall of the envelope by a releasable adhesive.

Figure 2:
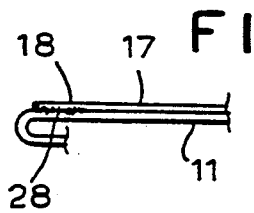
FIG. 2 is an enlarged, fragmentary cross sectional view as taken generally on line 2—2 of FIG. 1.

In the illustrated and preferred embodiment of FIG. 1, the upper and lower margins 18, 19 of the cover sheet are adhered to the envelope front wall 11 by releasable adhesive means. This allows the cover sheet to be peeled away from the envelope front wall 11 without causing any damage to the latter. As shown in FIG. 2, for example, the edge margin 18 is semi-permanently bonded to the underlying front wall 11 by a narrow strip of a peel-away type of adhesive 28. A similar construction is provided at the lower margin 19 as will be understood.

With reference to FIGS. 8 and 9, the sealable closure flap 13 is conventionally connected to the front wall 11 of the envelope at an upper fold 30. Pursuant to the invention, the closure flap includes at least two adhesive areas 31, 32 which are spaced from each other and extend generally across the full width of the flap. Desirably, the first adhesive area 31 is located at the free edge margin 33 of the closure flap, whereas the second adhesive area 32 is spaced some distance away from the first adhesive area 31, but nevertheless in a region such that, when the flap is folded over the back wall 12 of the envelope, the second adhesive area 32 overlies portions of the back wall 12 and is capable of being adhered thereto.

Also pursuant to the invention, the closure flap 13 includes at least one tear strip element 34 and at least one associated guide strip element 35. The tear strip element 34 is formed of a suitable relatively non-tearable plastic material, of which polyvinylchloride is one example, many others being well known to persons skilled in the relevant art. The tear strip 34 is carried by the inside surface of the closure flap 13, and desirably extends across the full width of the flap, in an area between the first and second adhesive areas 31, 32. Desirably, a short tab portion 34a projects from at least one end of the tear strip 34, to facilitate gripping and pulling by a user.

The guide strip 35 is carried on the outside surface of the closure flap and extends adjacent to and parallel with the tear strip 34, as reflected in FIG. 9. Thus, the tear strip 34 and guide strip 35 provide at least one set of adjacent edges such that, when the tear strip 34 is pulled outwardly with respect to the closure flap 13 sealed closed by the first adhesive area 31, the closure flap is severed cleanly along a line between the adjacent edges of the tear strip 34 and guide strip 35.

Preferably, and as shown in the version of FIGS. 8 and 9, the closure flap arrangement includes a second guide strip 36 spaced from and parallel to the guide strip 35, such that the guide strips 35, 36 straddle the tear strip 34 and provide effective cutting/tearing edges along both sides of the tear strip 34. In addition, the version of FIGS. 8 and 9 includes a second tear strip 37 and a third guide strip 38. The guide strips 35, 38 straddle the second tear strip 37 and provide defined cutting-/tearing edges on opposite sides of the second tear strip.

In utilizing the envelope structure of FIGS. 1, 2, 8 and 9, the desired contents for a first delivery are inserted in the envelope, which is then closed and sealed by activating the first adhesive area 31 of the closure flap. The first destination address is provided on the outside surface of the removable, tear-away cover sheet 17, which is also used to apply the necessary postage and return address, if any. When the envelope is received at the first destination, it is opened by pulling the tear strip 34, freeing the adhesively secured free end of the closure flap from the balance of the flap and permitting the flap to be opened for removal of the contents.

The envelope, once opened at the first destination, is readied for a second use by tearing off the cover sheet 17. This is done by gripping the pull tab 22 at one end of the envelope and pulling across the face of the envelope, peeling off the entire cover sheet without tearing the underlying front wall 11. Removal of the cover sheet exposes the surface of the primary envelope front wall 11, which may be preprinted with a second destination address, postage and the like, or may be provided with such by the user, as desired.

In desired cases, the front wall 11, can be provided with an address window 29 so that the second destination address can be provided by the contents inserted by the first recipient. Indeed, by providing aligned address windows 29, 29a in both the envelope front wall 11 and the tear-away cover sheet 17, the destination addresses can be supplied by contents inserted by the first sender, as well as by the second sender.

After the first recipient has readied the front of the envelope with the proper information for the second destination, and inserted the desired contents into the envelope body, the envelope may be sealed by activating the second adhesive area 32 and pressing the flap closed, so that the adhesive 32 bonds to the back wall 12 of the envelope.

In the version of the invention illustrated in FIGS. 8 and 9, the second recipient of the envelope conveniently opens it by pulling on the second tear strip 37, severing the connected portion of the closure flap from the adhesive area 32. In desired cases, for purposes of economy, the second tear strip 37 and guide strip 38 may be omitted, in which case, the second recipient opens the envelope in a conventional manner. Since the envelope will be discarded by the second recipient in any event, the provision of a neatly torn opening line is of less importance than in the case of opening by the first recipient, as will be readily appreciated.

In the structure illustrated in FIG. 9, the second adhesive is a so-called dry adhesive, which is activated for use by moistening. In some cases, it may be desirable to utilize a pressure-sensitive adhesive for the second adhesive area 32. In such cases, the exposed surface of the pressure-sensitive adhesive could be temporarily covered, as by a strip of cellophane (not shown), assuring that the second adhesive remains inactive until the envelope is to be resealed by the first recipient.

As will be appreciated from the foregoing description, the primary envelope body, comprising the front wall 11, back wall 12 and closure flap 13, is utilized for the second delivery as well as the first. Thus, any document of a size appropriate to be directed to the first addressee can be re-inserted in the envelope and directed to the second addressee. In contrast, many of the available structures in which a return envelope can be detached from or assembled from the original mailing, the return envelope is of a smaller size than the envelope used for the first mailing. Frequently, this requires that documents be refolded into a bulkier and less convenient form for mailing to the second destination.

With reference to FIGS. 3–7, there are shown a variety of alternative tear tape structures for securing the upper and lower margins of the tear-away cover sheet 17 to the edges of the envelope front wall 11. In these last mentioned versions, the vertical height of the cover sheet 17 is somewhat less than the vertical height of the envelope front wall 11; providing edge margins 40 at both the top and bottom edges of the front wall 11, which are not covered by the cover sheet 17.

Figure 3:
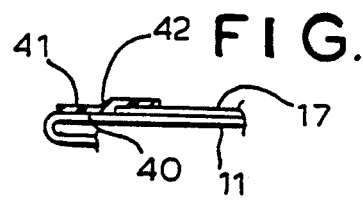
FIG. 3 is a cross sectional view, similar to that of FIG. 2, illustrating a modified means for securing a front cover sheet to the envelope front wall utilizing a separate tearable strip element.

In the modification of FIG. 3, a mounting tape 41 extends along the full length of each of the edge margins 18, 19, with a portion of the tape overlying an edge margin of the cover sheet 17 and an adjacent portion of the tape overlying an edge margin 18 or 19 of the envelope front wall. The bottom surface of the mounting tape is coated with an appropriate adhesive, so that the cover sheet 17 is securely fastened to the envelope front wall 11 by the tape 41. In the FIG. 3 version, the mounting tape 41 is provided with a longitudinally extending line of weakness 42, such as a perforation line, running continuously along the center of the tape. Thus, when the cover sheet is engaged by the pull tab 22 and pulled across the face of the envelope, the mounting tapes 41 sever cleanly along the lines of weakness, at each edge of the cover sheet, enabling the cover sheet to be quickly and cleanly removed from the front wall 11 of the envelope.

Figure 4:
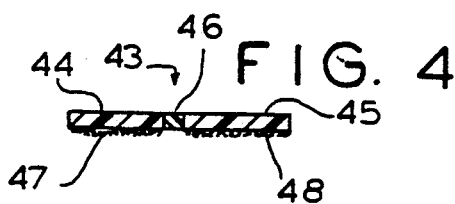
FIGS. 4–7 are enlarged, cross sectional views illustrating modified forms of tearable strip elements usable in the modification of FIG. 3.

In the modification of FIG. 4, a plastic mounting tape 43 is formed with relatively non-tearable opposite side margins 44, 45 joined integrally by a narrow center section 46, which is heat-treated, formed of co-extruded tearable material, or otherwise conditioned to easily rupture and thus form a longitudinally extending line of weakness down the center of the mounting tape. Areas of adhesive 47, 48 are applied to the relatively non-tearable portions of the mounting tape, which is applied to the assembly substantially in the manner of the mounting tape 41 of FIG. 3.

Figure 5:
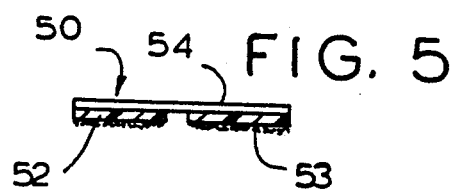

In the version of FIG. 5, a mounting tape 50 is comprised of a tearable (e.g. paper) carrier strip 51 which carries on its bottom surface a pair of plastic strips 52, 53 spaced slightly apart and each carrying an adhesive on its exposed surface. The mounting tape 50 is applied in the same manner as the tape 41 of FIG. 3. When the front cover 17 is torn away from the envelope, the tape 50 severs along the line 54 defined by the two strips 52, 53 formed a relatively non-tearable material.

Figure 6:
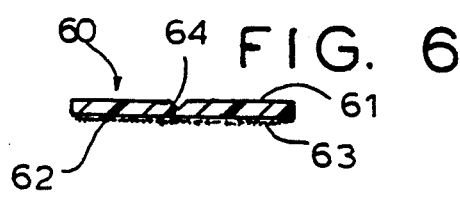

In the version of FIG. 6, the mounting tape 60 may be formed of a single strip 61 of plastic material carrying spaced adhesive areas 62, 63 on its bottom surface. Depending on the characteristics of the strip 61, it may be weakened by a longitudinally extending groove 64 to define a central, longitudinal tear line. If desired the plastic strip may incorporate a plurality of longitudinally extending fiberglass or similar reinforcements, such that the strip can tear longitudinally along an indeterminate line.

Figure 7:
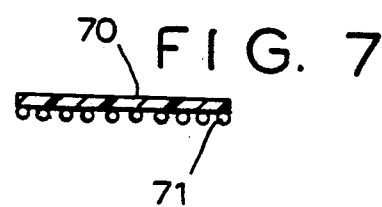

In the version illustrated in FIG. 7, a tearable strip 70 is provided on one surface with a plurality of longitudinally extending elements of fiberglass or other strong filamentary material 71. The strip can thus tear longitudinally along an indeterminate line.

As will be understood, the modified mounting arrangements shown in FIGS. 3–7 are exemplary only, as other arrangements may be employed, consistent with the objectives of the main invention.

With reference to FIGS. 10–15, representative alterative arrangements are shown for construction of the closure flap 13 in a manner consistent with the objectives of the invention. In the version of FIG. 10, the closure flap 113 carries first and second adhesive areas 131, 132 and first and second tear strips 134, 137 substantially in the manner of the closure flap structure of FIG. 9. Guide strips 135, 136 and 138, corresponding in function to guide strips 35, 36 and 38 of FIG. 9, are not mounted directly on the closure flap 113 but are preassembled on a single carrier strip 140. The carrier strip is formed of paper or other easily tearable material and is provided on its bottom surface with adhesive. This arrangement enables the three guide strips to be applied in a single operation using the pre-assembled structure of guide strips and carrier strip. Otherwise, the modification of FIG. 10 functions identically to that of FIG. 9.

In the modification of FIG. 11, the arrangement of adhesive areas 231, 232 and first and second tear strips 234, 237, as well as the arrangement of the guide strips 235, 236, 238 is functionally the same as for FIGS. 9 and 10. However, all of the foregoing elements are pre-assembled on a single carrier strip formed of paper or other tearable material 240 which in itself functions as the sealable closure flap 213. At its upper edge margin 241, the strip 240 is adhesively secured to a short hinge flap section 242, which is connected by a fold 243 to the front wall 211 of the envelope structure.

In the modification of FIG. 12, the operative portion of the closure flap 313 carries first and second adhesive areas 331, 332 and spaced apart tear strips 334, 337, while functioning in the manner generally described above. Instead of individual guide strips, as provided in the versions of FIG. 9–11, the version of FIG. 12 provides for a closely spaced series of individual string-like elements 340, of fiberglass or other strong material, which extend across the full width of the closure flap 313. Any adjacent pair of the string-like elements can define a controlled tear line, in accordance with known concepts.

Also illustrated in the version of FIG. 12 is the optional provision of a cellophane strip or the like 341, which can be placed over the exposed surface of the second adhesive area 332 to extend across the full width of the closure flap. The cover strip 341 ca be utilized to advantage where the adhesive 332 is of a self-activating (e.g., pressure-sensitive) type.

Figure 13:
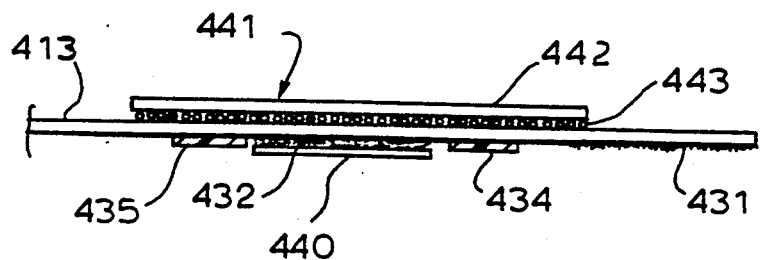

In the modification of FIG. 13, the operative portion of the closure flap 413 is provided with first and second adhesive areas 431, 432, with the latter optionally being covered by a protective strip 440. Tear strips 434, 435 are positioned adjacent the two adhesive areas 431, 432. Secured across the outer face of the closure flap 413 is a tape assembly 441 comprising a carrier strip 442, formed of paper, plastic, film, fiberglass or other readily tearable material and carrying a plurality of string-like elements 443 of fiberglass or other suitable material. The functioning of the string-like elements 443 is generally the same as that of the modification of FIG. 12. In the case of the FIG. 13 modification, however, the strings 443 may be preassembled with the carrier tape 442 to facilitate utilization.

Figure 14:
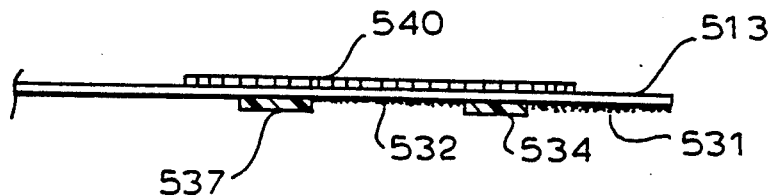

In the version of FIG. 14, first and second adhesive areas 531, 532 are provided on the closure flap 513, the second area 532 optionally being covered prior to use. Separate tear tapes 534, 537 are also carried on the inside face of the closure flap. Both tear strips have associated therewith a common guide strip 540, of sufficient width to extend across both tear strips. The guide strip is formed of a material having linear, but not transverse tear characteristics, such that linear tear lines are formed automatically, along the edges of the tear strips, when the latter are pulled outward.

Figure 15:
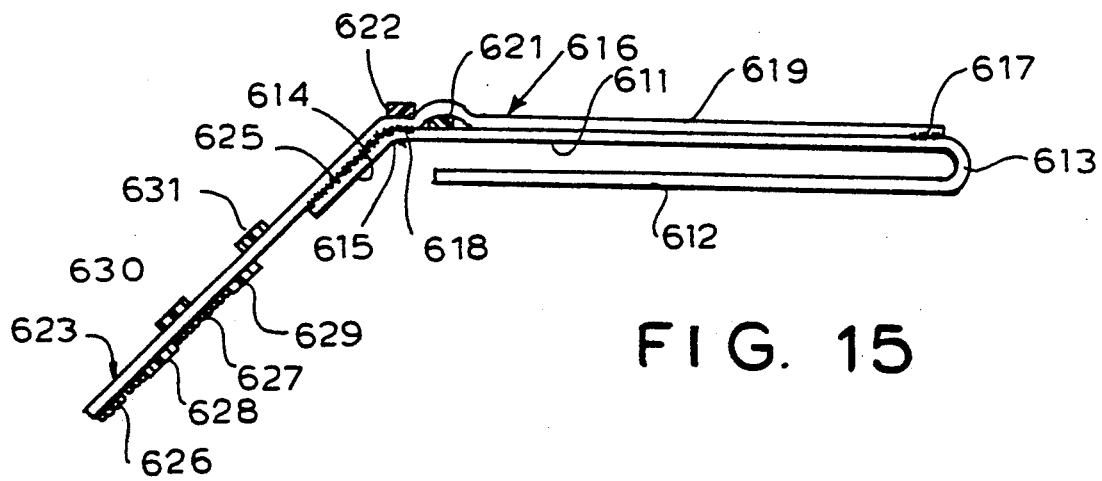
FIG. 15 is a cross sectional view of a further modification in which a single sheet forms a removable front sheet and a re-usable sealing flap.

In the modification of FIG. 15, a single sheet functions to provide both the removable cover sheet and the resealable flap structure of the envelope. Thus, in the illustration of FIG. 15, the principal envelope body is defined by a back wall 612 a front 611 joined along a bottom fold 613. A short stub flap 614 is connected to the upper edge of the envelope front wall 611, along a fold line 615. A combined removable cover sheet and reusable closure flap, generally designated by the reference numeral 616 is secured in limited areas 617, 618 to the upper and lower edges of the envelope front wall 611, forming a cover sheet 619. The attachment of the cover sheet 619 at the lower edge of the envelope, at 617, advantageously may be by way of a strip of releasable adhesive, in the manner of the device of FIG. 1. At the upper edge of the cover sheet, attachment to the envelope front wall more advantageously is by means of the narrow adhesive strip 618, along the uppermost margin, in conjunction with a suitable tear strip-guide strip combination 621, 622.

In the modification of FIG. 15, a reclosable envelope flap 623 is integrally attached to the cover sheet 619, at an upper fold line 624. Portions of the closure flap 623 adjacent to the fold line 624 are secured to the stub flap 614, by means of adhesive 625. The reclosable flap 623 may be provided with a variety of opening features, such as heretofore described. By way of example, the flap 623 has spaced apart adhesive areas 626, 627 which preferably extend across the full width of the flap. Along the inner edge of each of the adhesive areas, a tear strip element 628, 629 is provided, secured to the lower surface of the flap. A guide strip element 630, 631 is associated with each of the tear strip elements, in each case being positioned on the outside surface of the envelope flap and adjacent the edge of the associated tear strip which lies opposite the adhesive area with which the tear strip is associated.

When the device of FIG. 15 is used, it is initially sealed closed with the first adhesive area 626 and addressed to the first recipient on the outer surface of the cover sheet 619. The first recipient opens the envelope by lifting the tear strip 628, severing the closure flap 623 neatly along the tear line formed by the tear strip 628 and guide strip 630. In order to reuse the envelope, the cover sheet 619 is removed by first lifting the tear strip 621 to sever the upper edge of the cover sheet, after which the cover sheet may be peeled off of the envelope, by separation of the releasable adhesive along the lower edge margin. The front surface of the envelope wall 611 is then available for return addressing and postage. The envelope may be resealed by activating the second adhesive area 627 and reclosing the flap 623.

In all of the cases wherein guide strips and/or string-like reinforcing elements are mounted on carrier strips, it will be understood that the preassembly may be utilized either in the illustrated orientation or in a reverse orientation. That is, the carrier strip may be adhered directly to the closure flap, or the assembly may be reversed, with the carrier strip on the outside and the individual guide strips or other elements adhered directly to the closure flap. The functioning of the device is basically the same in either case. Likewise, when desired, strip-like tear strip elements may be replaced by string or filament-type elements.

The invention provides a relatively simplified and economical reusable, returnable envelope structure which is extremely "user friendly" and which, among other desirable attributes, provides a return envelope that is as large as that used for the initial transmission. Indeed, the same envelope body is utilized for both the original and the return transmissions.

After the initial opening by the first recipient, the envelope may be quickly readied for a second delivery by simply tearing off the removable cover sheet and re-sealing the closure flap using the second adhesive area provided. In many cases, it will prove practical to pre-address the surface of the primary envelope front wall 11 and then perhaps even provide postage thereon, so that the return envelope is ready for immediate re-delivery.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A remailing envelope which comprises,
 (a) a primary envelope body including a front wall, a back wall, and a sealable closure flap,
 (b) said sealable closure flap extending from a selected edge of said envelope and having at least first and second spaced-apart adhesive areas extending across an inner surface area of said closure flap for securing said flap to said back wall,
 (c) said first adhesive area being spaced farther from said selected edge than is said second adhesive area,
 (d) a first tear strip carried by said closure flap, positioned between said spaced-apart adhesive areas and extending across the width of said closure flap,
 (e) a second tear strip carried by said closure flap in spaced-apart relation to said first tear strip,
 (f) said first tear strip being more remote than said second tear strip from said selected edge,
 (g) said first tear strip serving to provide a first opening means for said envelope,
 (h) said second adhesive area being located between said first and second tear strips and serving to provide second closure means for said envelope after a first opening thereof,
 (i) said second tear strip providing a second opening means for said envelope,
 (j) first and second guide strip forming means carried on said closure flap in parallel relation to said first and second tear strips and associated in straddling relation to said first and second tear strips,
 (k) said first and second guide strip forming means including one common guide strip forming portion positioned between said first and second tear strips.

* * * * *